Oct. 11, 1960
A. L. G. CIANCHI
2,956,219
ELECTRICAL CONDENSERS
Filed Sept. 21, 1954
4 Sheets-Sheet 1
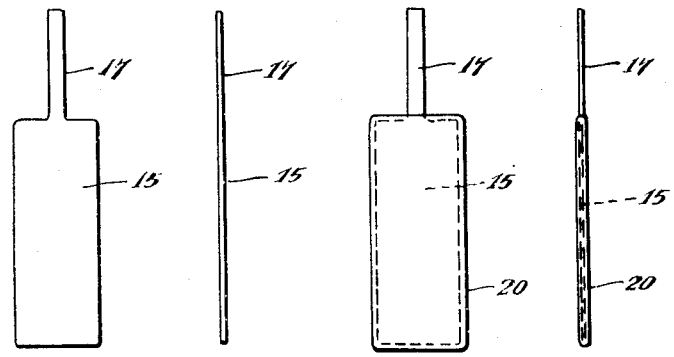
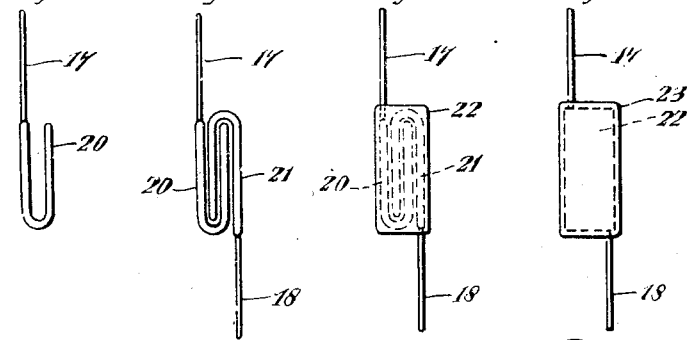
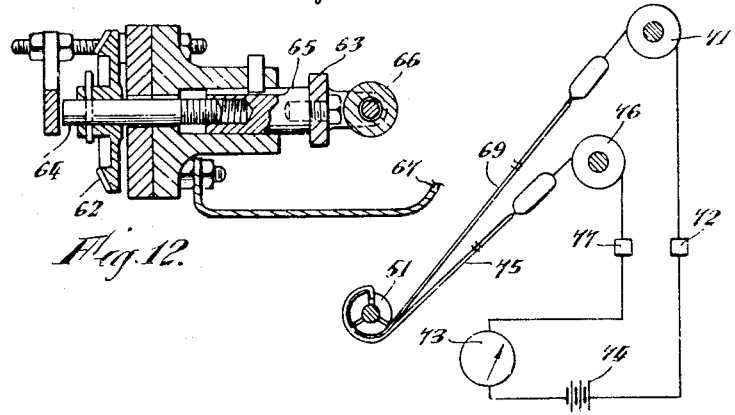
INVENTOR
Alfredo Luigi Giuseppe Cianchi
By Albert Jacobs
Attorney

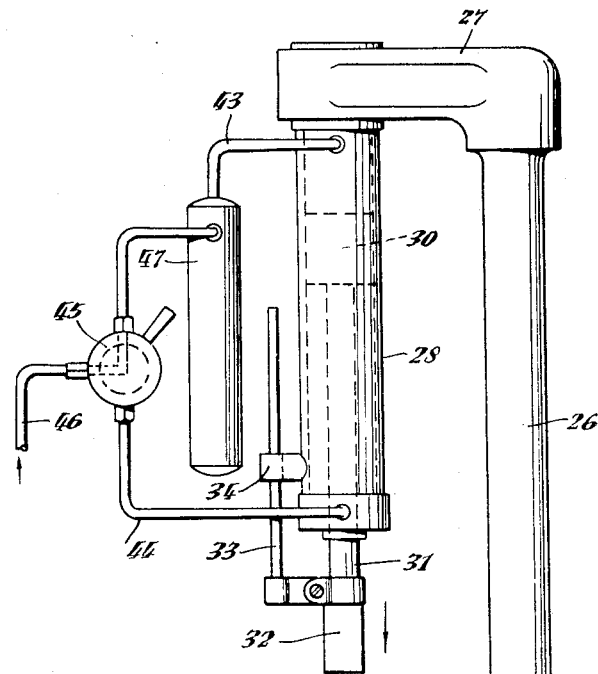
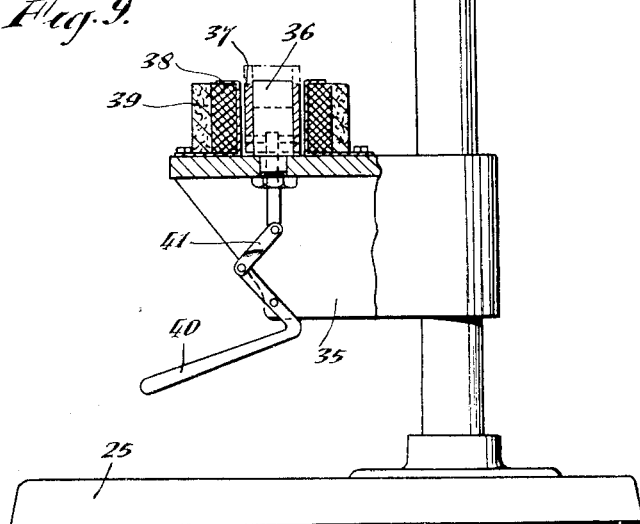
Fig. 9.
INVENTOR
Alfredo Luigi Giuseppe Cianchi
By Albert Jacobs
Attorney Oct. 11, 1960 A. L. G. CIANCHI 2,956,219
ELECTRICAL CONDENSERS
Filed Sept. 21, 1954 4 Sheets-Sheet 3

INVENTOR
Alfredo Luigi Giuseppe Cianchi
By
Attorney

Oct. 11, 1960   A. L. G. CIANCHI   2,956,219
ELECTRICAL CONDENSERS
Filed Sept. 21, 1954   4 Sheets-Sheet 4

INVENTOR
Alfredo Luigi Giuseppe Cianchi
By
Attorney

United States Patent Office 2,956,219
Patented Oct. 11, 1960

2,956,219

ELECTRICAL CONDENSERS

Alfredo Luigi Giuseppe Cianchi, Adeyfield, England, assignor to Welwyn Electrical Laboratories Limited, Northumberland, England, a company of Great Britain and Northern Ireland Filed Sept. 21, 1954, Ser. No. 457,434

3 Claims. (Cl. 317—258)

This invention relates to electrical condensers of the kind consisting of thin plates of foil or metal, for example aluminium or copper, separated by an insulating material.

It is an object of the present invention to provide a method for providing a condenser coated with a glass coating in such a way that the application of the glass coating is more easily controlled than by hitherto known processes.

It is a further object of the invention to provide an electrical condenser which has a good resistance to atmospheric attack.

These and other objects which will become apparent hereinafter, are accomplished by the present invention.

According to the present invention, a process for the production of a condenser comprises coating at least two metal plates with a suspension of glass powder in a liquid, drying the resulting glass coatings, assembling the glass coated plates together, fusing the glass on the plates and applying pressure to the resulting assembly while the glass is in fused condition so as to form a condenser.

The temperature at which the glass on the plates is fused is suitably from 450 to 570° C., and the pressure which is applied to the assembly is suitably from 10, preferably 40, to 100 lbs./sq. in. It must be understood, however, that the temperature and pressure for fusing and pressing respectively will depend on the kind of glass used and also on the time which elapses between fusing and pressing; in this connection it is stated that it is recommended to apply pressure to the assembly as soon after fusion as possible. In general, when there is a time lag between fusion of the glass on the condenser plates and applying pressure to the assembly, it is necessary to use higher temperatures and/or pressures than when the pressing immediately follows the fusion.

The metal plates for the condenser are suitably of copper, brass, nickel, nickel-iron alloy, aluminium, magnesium or steel.

The use of a suspension of glass powder in a liquid is an essential feature of the invention and is found to be more easily controllable than molten glass. The application of pressure while hot is a necessary feature in combination with the use of a suspension and serves to control the thickness and uniformity of thickness of the glass and as far as possible to press out any bubbles of air or other gas that might adversely affect the electrical characteristics of the condenser. If desired the plates during pressing may be connected in an electrical circuit which includes means for indicating the capacity of the condenser and adjusting at least one factor controlling the thickness of glass between the plates according to the capacity required, these factors for a given type of condenser being the degree of pressure, period of application of pressure, and the temperature.

In carrying out the process of the invention a method of testing may be employed which consists in using a glass which has a degree of electrical conductivity at the temperature employed, connecting the plates to a galvanometer and a source of electricity, observing the galvanometer during testing thereby observing an indication of thickness of the glass, and adjusting the pressure accordingly.

The invention further includes novel condensers having a dielectric layer of a composition defined hereinafter and a coating to protect them from atmospheric influence.

The invention also includes a special machine for use in making condensers.

In order that the invention may be fully understood the construction of two forms of condensers and of suitable apparatus for making them will now be described by way of example with reference to the accompanying drawings wherein:

Figures 1 to 8 show stages in the manufacture of one form of condenser;

Figure 9 is an elevational view of a press for use in making the condenser;

Figure 12 is a sectional view on the line 12—12 on Figure 11;

Figure 13 is a view showing the electrical testing circuit; and

Figure 10:
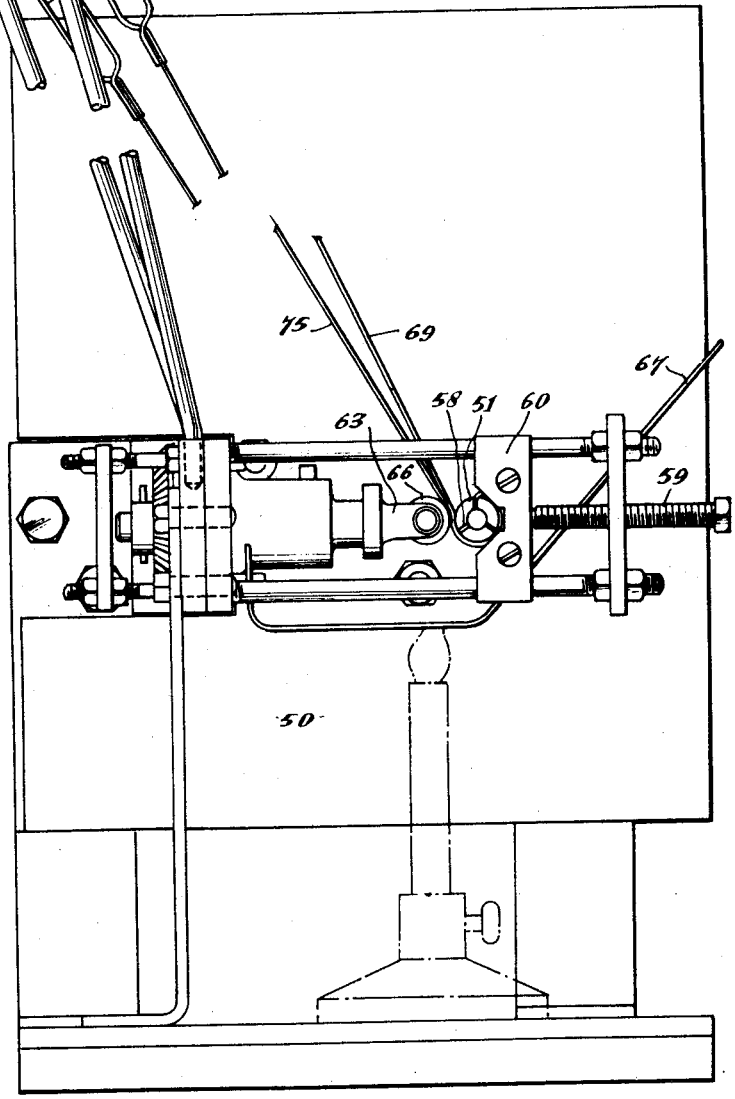
Figure 10 is an elevational view of a machine for making another form of condenser.
Figure 11:
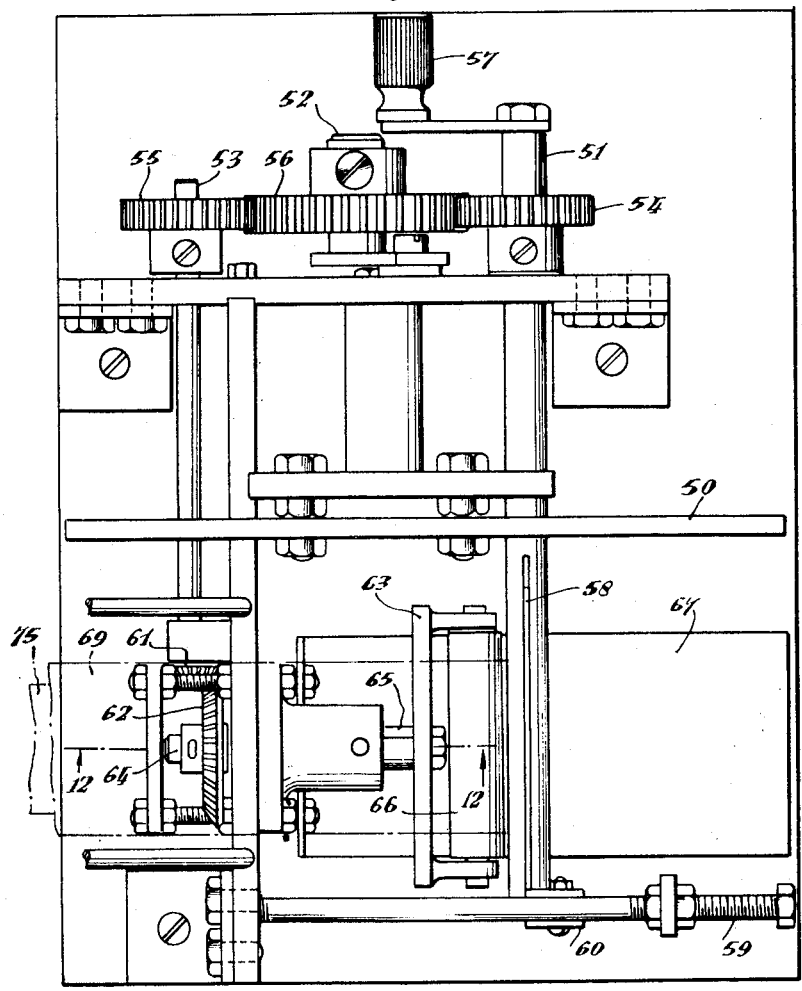
Figure 11 is a plan view thereof.

The form of condenser shown in Figures 1 to 8 consists of two metal plates 15 each having a length about three times their width and having an integral narrow extension 17, 18 at one end. These strips are dipped in the suspension of powdered glass in water or other suitable liquid (sometimes called a "slip"). The suspension is dried and the glass is fused to form coatings 20, 21. The plates are folded over across their transverse centre lines so that the two halves of each plate are parallel to each other or side by side as shown in Figure 5. The free half or leg of one plate (i.e. the half not having the integral extension) is placed between the two halves or legs of the other plate so that the two extensions project in opposite directions as shown in Figure 6. The plates are then again dipped in an aqueous suspension of powdered glass which is dried forming an envelope 22. The plates are then heated and placed in a press which is heated to fuse the glass and simultaneously pressure is applied to the coated plates. At the same time the two extensions may be connected electrically together through a galvanometer and an electric battery in which case the pressure on the plates is adjusted so as to bring the galvanometer needle to a reading corresponding to the thickness of glass required. Should there be a fault due for example to misshapen plates this will be detected by the galvanometer and the cost of further processing a faulty condenser will thus be avoided. This method of test may however be dispensed with after experience has enabled the operation to be stabilized.

Plates similar to those shown in Figures 5 and 6 may be made with any number of bends on a suitable tool to provide more than two parts side by side, so that the two plates can be slid endwise into each other. Two or more condensers as shown in Figure 7 may be fused and pressed together and their adjacent plates connected to form a single condenser.

The invention lends itself easily to mass production of condensers. For this purpose the metal plates 15, 16 may be hung on a travelling belt which carries them through cleaning and degreasing baths, and dips them into a slip of finely powdered glass. The plates are then carried by the belt through a drying zone and then through an oven where they are heated (e.g. to 600° C. for about 3 minutes) so that the powdered glass melts and covers the whole of the plates. The plates are then bent to the required shape and placed on a metal strip with their ends 17, 18 bent around the strip. The strip is then placed in a heated press. In many cases after the pressing process the condensers may be dipped in another slip of powdered glass and then re-fired this being done in cases where a special finishing coat 23 (Figure 8) at the surface of the condensers is required to comply with the requirements of tropical conditions or other unfavourable weather conditions. The condensers are in such case again refired and annealed.

A suitable press is shown in Figure 9 and comprises a base 25 carrying a standard 26 having an overhanging arm 27 from which a cylinder 28 is suspended. A piston 30 in the cylinder is attached by connecting rod 31 to a press block 32, the rod being held against rotation by a guide rod 33 fixed to the connecting rod 31 and working in a guide 34. The standard 26 also carries a bracket 35 that supports an anvil 36 around which is a stripper 37, an electrical resistance heating coil 38, and asbestos lagging 39. The stripper is actuated by a hand lever 40 and link 41. Fluid pressure is supplied to the upper part of the cylinder to effect the pressing operation and to the lower part of the cylinder to raise the press block. The fluid is introduced to the cylinder by pipes 43, 44 from a valve 45 supplied from any suitable source by pipe 46. A buffer container 47 is inserted between the valve and the pipe 43 to ensure stability of pressure.

Figure 14:
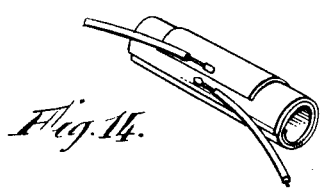
Figure 14 is a perspective view of the condenser made by said machine.

Another form of condenser consists (Figure 14) of two plates coated with glass and rolled up together whilst hot so that the pressure is effected during rolling. The sheets may be connected to a galvanometer and battery as before and the speed of rolling and/or temperature adjusted according to the galvanometer reading.

An apparatus suitable for making these rolled condensers is shown in Figures 10 to 13 and consists of a frame 50 carrying three horizontal spindles 51, 52, 53 in a common plane, the first (51) and third (53) of these spindles carrying pinions 54, 55 meshing with a gearwheel 56 carried by the second or middle spindle. The first spindle also carries a crank handle 57 whereby it can be rotated and is tubular and split at 58 along one generatrix so that the ends of the plates can be placed therein and wound together. The free end of this tubular spindle is engaged by a block 60 adjustable by screw 59 to maintain its axial alignment during heating. The third spindle carries a small toothed wheel 61 in mesh with a gearwheel 62 which carries a rod 64 that is threaded to form a worm at one end where it engages an internally threaded member 65 which is disposed at right angles to the spindles and carries a bracket 63 in which roller 66 is rotatably mounted adjacent and parallel to the tubular spindle 51. The tubular spindle and roller are heated by suitable means; for example a metal plate 67 disposed beneath them is heated by a Bunsen burner. The first coated plate or foil 69 has one end placed in the slit of the tubular spindle and the latter is rotated for example to make a complete revolution. The free end of the plate 69 is connected to a thin wire 70 which extends over a pulley 71 and carries a weight 72 (Figure 13) whereby the plate or foil is held taut. The free end of the plate is also connected to one end of the other plate 75 through a galvanometer 73 and electric battery 74 (Figure 13). The other plate 75 passes over a pulley 76 and is held taut by a weight 77. When the glass on the first plate around the tubular spindle begins to fuse the second plate is inserted into the coil of the first plate and the two plates are then slowly wound together by rotating the tubular spindle whilst watching the galvanometer and adjusting the Bunsen flame and/or the speed of rolling to maintain the galvanometer needle at the required reading. As the winding proceeds the roller 66 will contact the roll and will move progressively away from the tubular spindle thereby assisting in control of the shape of the roll and uniformity of the glass thickness.

Various modifications may be made to these condensers and apparatus. For example, the flat plate condenser may consist of one flat plate and a second larger plate having its sides or ends bent over the first plate and pressed flat down to it. The condensers may of course have three or more plates. Additional coatings of glass may also be applied.

Appropriate glass compositions for the dielectric layer must be used and suitable compositions are as follows.

| | Percent by weight |
|---|---|
| Lead oxide (PbO) | 45 to 75 |
| Boron oxide ($B_2O_3$) | 6 to 25 |
| At least one oxide selected from the group consisting of the oxides of zirconium, aluminium and calcium ($ZrO_2$, $Al_2O_3$, CaO) | 10 to 30 |
| Silica ($SiO_2$) | 0 to 18 |
| Other oxides used in glasses or ceramics | 0 to 30 |

It is advantageous that the above glass composition contains all of the oxides $Al_2O_3$, $B_2O_3$, CaO in the following proportions:

| | Percent by weight |
|---|---|
| $Al_2O_3$ | 2 to 12 |
| $B_2O_3$ | 7 to 12 |
| CaO | 0.5 to 10 |

Suitably the glass composition contains the following oxides in the proportions specified:

| | Percent by weight |
|---|---|
| MgO | 0.5 to 3 |
| $TiO_2$ | 3 to 14 |
| BaO | 10 to 15 |

Furthermore, the glass composition may contain the following oxides in the proportions specified:

| | Percent by weight |
|---|---|
| $Na_2O$ | 0.5 to 6 |
| $K_2O$ | 4 to 10 |
| SrO | 0.5 to 6 |
| $Li_2O$ | 0.5 to 5 |

The proportion of PbO in the above glass composition is suitably at least 48 percent and the PbO and BaO together amount to at least 60 percent.

Suitably the electrical condensers made in accordance with the process of the invention has its metal plates provided with a dielectric composition consisting of a fused mixture of the following:

| | Percent by weight |
|---|---|
| PbO | 47 to 54 |
| $Al_2O_3$ | 3 to 7 |
| $B_2O_3$ | 6 to 10 |
| $SiO_2$ | 2 to 7 |
| CaO | 2 to 6 |
| MgO | 1 to 3 |
| $TiO_2$ | 6 to 12 |
| BaO | 10 to 15 |
| $Na_2O$ | 0.5 to 2 |
| $K_2O$ | 4 to 6 |
| $ZrO_2$ | 1 to 5 |
| $Li_2O$ | 1 to 8 |

The following are examples of desirable compositions for the dielectric in oxide percentages by weight:

| Example No. | 1 | 2 | 3 | 4 | 5 | 6 | 7 |
|---|---|---|---|---|---|---|---|
| PbO | 75 | 70 | 65 | 60 | 55 | 55 | 50 |
| $Al_2O_3$ | 10 | 8 | 7 | 6 | 6 | 3 | 3 |
| $B_2O_3$ | 10 | 10 | 10 | 10 | 10 | 12 | 6 |
| $SiO_2$ | 2 | 1 | 1 | 2 | 2 | 2 | 5 |
| CaO | 3 | 2 | 2 | 3 | 2 | 1 | 3 |
| MgO | | 1 | 1 | 1 | 1 | | 1 |
| $TiO_2$ | | 5 | 7 | 8 | 10 | 11 | 9 |
| BaO | | 3 | 4 | 5 | 6 | 6 | 11 |
| $Na_2O$ | | | 1 | 2 | 3 | 4 | 1 |
| $K_2O$ | | | | | | | 4 |
| SrO | | | 2 | 1 | 2 | 1 | |
| $ZrO_2$ | | | | 2 | 3 | 4 | 1 |
| $Li_2O$ | | | | | | 1 | 5 |

In the further development of the invention it has been found that if the coated plates when under pressure are too hot the coating becomes too fluid and a non-uniform product results. Also if the plates are not hot enough the coating is insufficiently fluid and a non-uniform product again may result. Accordingly very close temperature control became necessary. However, it is now found that the glass may include a finely divided spacing material of considerably higher melting point than the remainder of the coating material. The coated plates may then be heated to a temperature well above the melting point of the main body of the coating material but below the melting point of the spacing material. The plates are then pressed together and are spaced apart uniformly by the spacing material. The spacing material may be barium or calcium titanate or other titanates having suitable electrical characteristics or a glass having a melting point appreciably higher than the melting point of the main body of the coating material, e.g. above 800° C. A suitable titanate or glass may be formed by heating titanium oxide $TiO_2$ with $BaCO_2$, $SrCO_3$, and/or other alkalis well known per se. For example the coating material may have the compositions indicated above but including 4 to 15 percent of the titanate by weight of the total solid content of the suspension. The titanate should be in the form of a calcined powder.

After hot pressing of the coated plates they may be coated with another glass the composition of which is selected not so much for its electrical characteristics but for its resistance to atmospheric attack. For instance the final coating may have a composition within the following range:

| | Parts by weight |
|---|---|
| PbO | 5–20 |
| $SiO_2$ | 30–54 |
| CaO+BaO | 10–28 |
| $Al_2O_3$ | 2–15 |
| $ZrO_2$ | 1–5 |
| $Li_2O+Na_2O+K_2O$ | 3–12 |
| $B_2O_3$ | 0–11 |

Examples of coating material for the final coating are as follows:

| Parts by weight of— | Example No. | | | | |
|---|---|---|---|---|---|
| | 1 | 2 | 3 | 4 | 5 |
| PbO | 16 | 9 | 7 | 15 | 6 |
| $SiO_2$ | 42 | 36 | 46 | 37 | 48 |
| CaO | 12 | 15 | 8 | 2 | 2 |
| BaO | 14 | 10 | 18 | 25 | 26 |
| $Al_2O_3$ | 6 | 12 | 9 | 7 | 3 |
| $ZrO_2$ | 4 | 3 | 4 | 2 | 3 |
| $Li_2O$ | | | | 5 | 6 |
| $Na_2O$ | | | | 6 | 4 |
| $K_2O$ | 6 | 11 | 6 | | 2 |
| $B_2O_3$ | | 4 | 2 | 1 | |

The suspension may be made by melting the glass, pouring it into water, milling the resultant frit more or less dry until it passes 180 mesh, mixing it with the spacing material, mixing the powder with sufficient water to give the resultant suspension a viscosity of 30 secs. No. 4 Ford viscosity cup. The suspension will have a thick creamy consistency.

When copper plates are to be coated with the glass slip, they are preferably as free as possible from oxidation products and for this purpose the plates may be dipped in a cleaning solution just prior to coating with the glass slip. Various solutions can be used for example the following mixture:

| | Percent by weight |
|---|---|
| Water | 75 |
| Sulphuric acid (concentrated) | 10 |
| Sodium or potassium dichromate | 15 |

To minimise oxidation of the copper during the process I preferably select a glass for the slip which has a melting point below 600° C., preferably 570° C., this being well below the melting point of the spacing glass.

Although the present invention has been described with particular reference to specific details, it is not intended that such details shall be regarded as limitations upon the scope of the invention except insofar as included in the accompanying claims.

What I claim and desire to secure by Letters Patent is:

1. An electrical condenser comprising a plurality of metal plates coated with a glass composition as the dielectric consisting of a fused mixture of the following:

| | Percent |
|---|---|
| Lead oxide | 45–75 |
| Boron oxide | 6–25 |
| At least one oxide selected from the group consisting of the oxides of zirconium, aluminium and calcium | 10–30 |
| Silicon oxide | Up to 18 |
| And magnesium oxide, titanium oxide, barium oxide, sodium oxide, potassium oxide and lithium oxide | Up to 30 | and a protective outer coating consisting of a fused mixture of the following:

| | Percent |
|---|---|
| Lead oxide | 5–20 |
| Silicon oxide | 30–54 |
| An oxide selected from the oxides of calcium and barium | 10–28 |
| Aluminium oxide | 2–15 |
| Zirconium oxide | 1–5 |
| An oxide selected from the oxides of lithium, sodium and potassium | 3–12 |
| And boron oxide | Up to 11 |

2. An electrical condenser comprising a plurality of metal plates made from a metal coated with a glass composition as the dielectric consisting of a fused mixture of the following:

| | Percent |
|---|---|
| Lead oxide | 45–75 |
| Boron oxide | 6–25 |
| Aluminium oxide | 2–12 |
| Barium oxide | 7–12 |
| Calcium oxide | 0.5–10 |
| Silicon oxide | Up to 18 |
| And magnesium oxide, titanium oxide, barium oxide, sodium oxide, potassium oxide and lithium oxide | Up to 30 | and a protective outer coating consisting of a fused mixture of the following:

| | Percent |
|---|---|
| Lead oxide | 5–20 |
| Silicon oxide | 30–54 |
| Calcium oxide and barium oxide | 10–28 |
| Aluminium oxide | 2–15 |
| Zirconium oxide | 1–5 |
| Lithium oxide, sodium oxide and potassium oxide | 3–12 |
| And boron oxide | Up to 11 | there being present in the glass dielectric layer a titanate in an amount of from 4–15% based on the weight of the dielectric layer.

3. An electrical condenser comprising a plurality of metal plates coated with a glass composition as the dielectric consisting of a fused mixture of the following:

| | Percent |
|---|---|
| Lead oxide | 47–54 |
| Aluminium oxide | 3–7 |
| Boron oxide | 6–10 |
| Silicon oxide | 2–7 |
| Calcium oxide | 2–6 |
| Magnesium oxide | 1–3 |
| Titanium oxide | 6–12 |
| Barium oxide | 10–15 |
| Sodium oxide | 0.5–2 |
| Potassium oxide | 4–6 |
| Zirconium oxide | 1–5 |
| And lithium oxide | 1–8 | there being present in said dielectric a powdered titanate in an amount of from 4–15% based on the weight of the dielectric, said condenser being provided with an outer protective glass coating consisting of a fused mixture of the following:

| | Percent |
|---|---|
| Lead oxide | 6–15 |
| Silicon oxide | 37–48 |
| Calcium oxide | 1.5–2.5 |
| Barium oxide | 24–27 |
| Aluminium oxide | 3–7 |
| Zirconium oxide | 1.5–3.5 |
| Lithium oxide | 4–7 |
| Sodium oxide | 3.5–6.5 |
| Potassium oxide | Up to 2 |
| And boron oxide | Up to 2 |

References Cited in the file of this patent

UNITED STATES PATENTS

| | | |
|---|---|---|
| 1,260,819 | Schwarzmann | Mar. 26, 1918 |
| 1,641,389 | Kroeger | Sept. 6, 1927 |
| 2,454,607 | Leberknight et al. | Nov. 23, 1948 |
| 2,469,867 | Danzig | May 10, 1949 |
| 2,526,703 | Smith | Oct. 24, 1950 |
| 2,526,704 | Bair | Oct. 24, 1950 |
| 2,527,693 | Armistead | Oct. 31, 1950 |
| 2,548,862 | Brandt | Apr. 17, 1951 |
| 2,643,020 | Dalton | June 23, 1953 |
| 2,696,577 | Smith | Dec. 7, 1954 |

FOREIGN PATENTS

| | | |
|---|---|---|
| 330,268 | Great Britain | June 4, 1930 |